US011199042B2

(12) United States Patent
Hall et al.

(10) Patent No.: US 11,199,042 B2
(45) Date of Patent: Dec. 14, 2021

(54) MULTIFUNCTION LOCK UNIT

(71) Applicant: Hall Labs LLC, Provo, UT (US)

(72) Inventors: David R Hall, Provo, UT (US); Jerome Miles, Spanish Fork, UT (US); Chris Jones, Spanish Fork, UT (US)

(73) Assignee: Hall Labs LLC, Provo, UT (US)

( * ) Notice: Subject to any disclaimer, the term of this patent is extended or adjusted under 35 U.S.C. 154(b) by 0 days.

(21) Appl. No.: 16/805,738

(22) Filed: Feb. 29, 2020

(65) Prior Publication Data

US 2021/0270082 A1 Sep. 2, 2021

(51) Int. Cl.

| | |
|---|---|
| ***B60R 25/00*** | (2013.01) |
| ***G05B 19/00*** | (2006.01) |
| ***G05B 23/00*** | (2006.01) |
| ***G06F 7/00*** | (2006.01) |
| ***G06F 7/04*** | (2006.01) |
| ***G08B 29/00*** | (2006.01) |
| ***G08C 19/00*** | (2006.01) |
| ***H04B 1/00*** | (2006.01) |
| ***H04B 3/00*** | (2006.01) |
| ***H04Q 1/00*** | (2006.01) |
| ***E05F 15/77*** | (2015.01) |
| ***G07C 9/00*** | (2020.01) |
| *E05F 15/668* | (2015.01) |

(52) U.S. Cl.

CPC .......... *E05F 15/77* (2015.01); *G07C 9/00896* (2013.01); *E05F 15/668* (2015.01); *E05Y 2600/62* (2013.01); *E05Y 2900/106* (2013.01); *G07C 2009/00769* (2013.01); *G07C 2009/00928* (2013.01)

(58) Field of Classification Search

CPC .... E05F 15/77; E05F 15/668; G07C 9/00896; G07C 2009/00769; G07C 2009/00928; E05Y 2600/62; E05Y 2900/106

USPC ........................................................ 340/5.71

See application file for complete search history.

(56) References Cited

U.S. PATENT DOCUMENTS

| | | | | |
|---|---|---|---|---|
| 9,454,893 | B1 * | 9/2016 | Warren | G08B 17/10 |
| 10,643,412 | B1 * | 5/2020 | Yang | G07C 9/00571 |
| 10,697,203 | B1 * | 6/2020 | Gokcebay | G07C 9/00309 |

(Continued)

FOREIGN PATENT DOCUMENTS

CN 206340078 U * 7/2017

OTHER PUBLICATIONS

B S Sanjay, N Kaushik, Srinivasan V, Prabhakar S,Kayalvizhi Jayavel, Design and Implementation of Smart Garage—an IoT Perspective, Dept of Information Technology, SRM University, SRM University Kattankulathur Chennai, India, 2017 (Year: 2017).*

*Primary Examiner* — Tanmay K Shah

(57) ABSTRACT

A multifunction lock unit is disclosed. The unit is a single, contained unit that includes a base box near an overhead door and a deadbolt in the base box that protrudes into a hole in the overhead door to lock the overhead door. The deadbolt is extendable into the hole and retractable out of the hole. The unit also includes an actuator in the base box coupled to the deadbolt and configured to extend and retract the deadbolt. There is a wireless communication module that can receive a signal from a control unit to extend or retract the deadbolt via the actuator, and send a signal to the motor unit to raise or lower the overhead door. The unit also has a light on the base box for displaying at least two colors of light to show a status of the unit.

20 Claims, 2 Drawing Sheets

(56) References Cited

U.S. PATENT DOCUMENTS

| | | | | |
|---|---|---|---|---|
| 2014/0311197 | A1* | 10/2014 | Abel | E05B 17/10 70/432 |
| 2016/0024823 | A1* | 1/2016 | McAndrew | G07C 9/00182 70/263 |
| 2016/0356061 | A1* | 12/2016 | Gledhill | E05B 17/2084 |
| 2019/0043290 | A1* | 2/2019 | Morris | G07C 9/00309 |
| 2019/0244448 | A1* | 8/2019 | Alamin | G07C 9/20 |
| 2019/0362576 | A1* | 11/2019 | Messina | E05B 65/06 |
| 2019/0368226 | A1* | 12/2019 | Sweeney | E05B 41/00 |

* cited by examiner

MULTIFUNCTION LOCK UNIT

TECHNICAL FIELD

The present disclosure is directed to the field of door access systems such as overhead doors that can be raised, lowered, or stopped by pressing a button on a unit mounted to a wall near the overhead door.

BACKGROUND

Garage door openers in many homes today include a remote opener in a car, a button near a door leading into the house, and a motorized lifter system that responds to signals from the remote opener or the button to open and close the door. There is no way to conveniently lock the garage door using these conventional systems. Also, conventional garage door systems that employ an optical sensor at ankle height to detect an obstruction and to stop the downward movement of the door cause a potentially dangerous situation. Many people try to press the inside button, run the length of the garage, and step over the optical beam before the door closes. This is a cumbersome and potentially dangerous practice that needs an improvement. There is a need for improved security and convenience with garage doors.

SUMMARY

Embodiments of the present disclosure are directed to multifunction lock unit including a base box mountable to a wall near an overhead door, the overhead door being raised and lowered by a motor unit, and a deadbolt in the base box configured to protrude into a hole in the overhead door to lock the overhead door. The deadbolt is extendable into the hole and retractable out of the hole. The unit also includes a manual switch coupled to the deadbolt. The deadbolt can be manually extended and retracted by the manual switch. The unit also includes an actuator in the base box coupled to the deadbolt and configured to extend and retract the deadbolt, and a wireless communication module that can receive a signal from a remote control unit to extend or retract the deadbolt via the actuator, and send a signal to the motor unit to raise or lower the overhead door. The unit also includes a button that when pressed causes the wireless communication module to instruct the motor unit to raise or lower the overhead door. The unit also has a visual indicator on the base box for displaying a ready status wherein the wireless communication module is in communication with the motor unit and the motor unit reports no problems, and a problem status representing a problem with at least one of the multifunction lock unit or the motor unit.

Further embodiments of the present disclosure are directed to a locking opener for an overhead door including an overhead door having a siderail at a side of the overhead door, the siderail having a recess, and a multifunction lock unit mounted to a wall near the overhead door, the multifunction lock unit comprising. The locking opener also includes a deadbolt configured to move between an extended position at least partway into the recess and a retracted position out of the recess. There is a manual switch coupled to the deadbolt, and a powered actuator coupled to the deadbolt and configured to move the deadbolt between the extended position and the retracted position. The locking opener also includes a first button on the multifunction lock unit configured to instruct the powered actuator to move the deadbolt between the extended position and the retracted position, and a second button on the multifunction lock unit configured to instruct a motor unit to raise, lower, or stop the overhead door. The locking opener also includes a power supply for the powered actuator.

In other embodiments the present disclosure is directed to a method of locking an overhead door including in a multifunction lock unit, receiving an instruction to extend a deadbolt from the multifunction lock unit into a recess in an overhead door, determining whether or not the recess is aligned with the deadbolt, and extending the deadbolt into the recess. The method also includes displaying a visual indication associated with a locked position of the deadbolt in the recess. Further aspects and embodiments are provided in the foregoing drawings, detailed description and claims.

BRIEF DESCRIPTION OF THE DRAWINGS

The following drawings are provided to illustrate certain embodiments described herein. The drawings are merely illustrative and are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

DETAILED DESCRIPTION

The following description recites various aspects and embodiments of the inventions disclosed herein. No particular embodiment is intended to define the scope of the invention. Rather, the embodiments provide non-limiting examples of various compositions, and methods that are included within the scope of the claimed inventions. The description is to be read from the perspective of one of ordinary skill in the art. Therefore, information that is well known to the ordinarily skilled artisan is not necessarily included.

Definitions

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms “a,” “an,” and “the” include plural referents unless the context clearly dictates otherwise. For example, reference to “a substituent” encompasses a single substituent as well as two or more substituents, and the like.

As used herein, “for example,” “for instance,” “such as,” or “including” are meant to introduce examples that further clarify more general subject matter. Unless otherwise expressly indicated, such examples are provided only as an aid for understanding embodiments illustrated in the present disclosure and are not meant to be limiting in any fashion. Nor do these phrases indicate any kind of preference for the disclosed embodiment.

As used herein, "man door" is meant to refer to a conventional door as opposed to an overhead door. "Wireless communication module" can mean a Wi-Fi module, a Bluetooth module, a ultra-high frequency (UHF) module, or other suitable wireless communication module or component thereof. "Overhead door" refers to a vertically retractable door such as a garage door. Some overhead doors are rolled around a shaft, others have hinged panels that are in a horizontal orientation when the overhead door is retracted. Some overhead doors are moved by a motor mounted to a shaft that rotates the shaft to raise and lower the overhead door. Other overhead doors are directly connected to the motor and the motor raises and lowers the doors directly.

Figure 1:
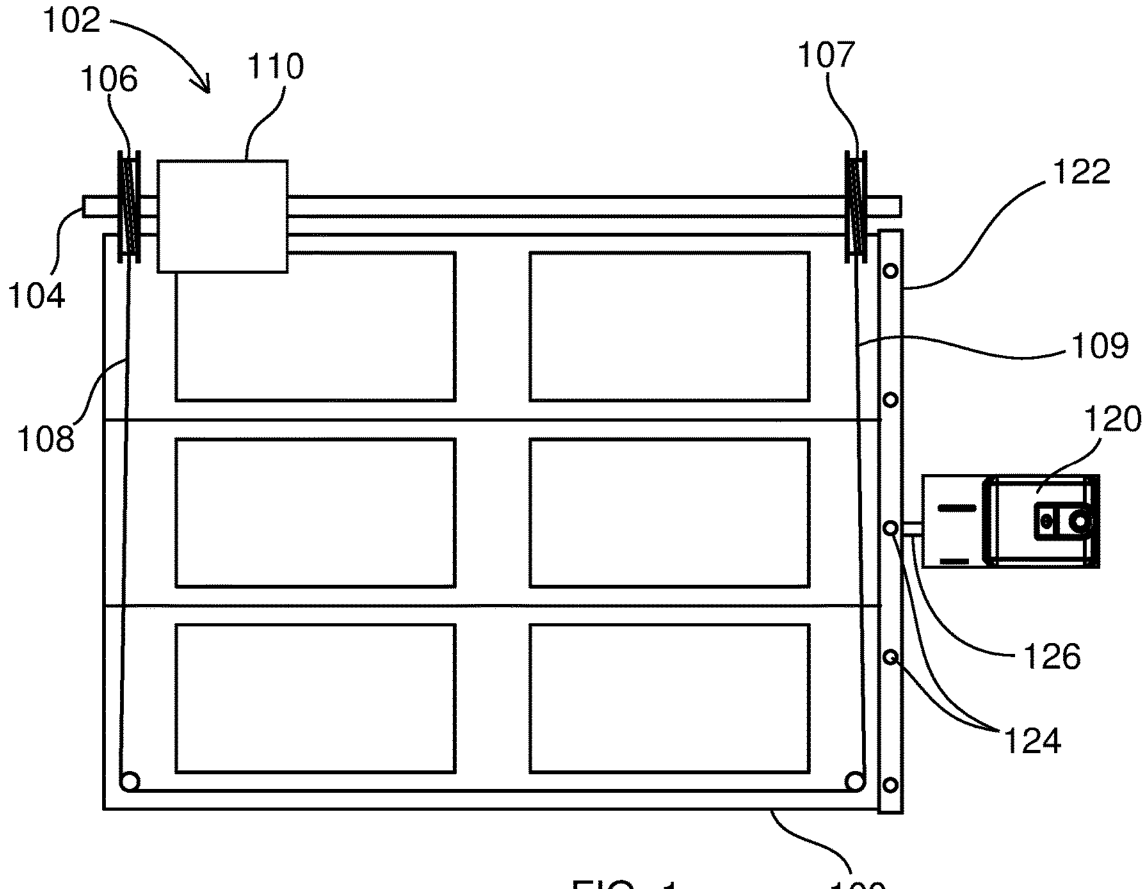
FIG. 1 shows a multifunction lock unit according to embodiments of the present disclosure.

FIG. 1 shows a multifunction lock unit 120 according to embodiments of the present disclosure. The multifunction lock unit 120 contains an electromechanical deadbolt 126 that can be manually activated, a lighting system to display status, and a wireless control module all contained in a single unit that is mounted near an overhead door 100. Many homes have overhead doors that are used to enter a garage. Many residential overhead doors are used for automobiles and are opened via a remote control in the automobile, and another controller in the garage to open and close the overhead door. The overhead door 100 of the present disclosure is coupled to an opener 102 which includes a shaft 104, spools 106 and 107 at either end of the shaft 104, and cables 108 and 109 that connect to the spools and to the overhead door 100. A motor unit 110 is coupled to the shaft 104 and turns the shaft 104 which turns the spools 106, 107 and winds the cables 108, 109 onto and off of the spools 106, 107 to raise and lower the overhead door 100, respectively. In some embodiments the cables are a single cable that extends from one spool 106 to the overhead door 100 and along the lower edge and up to the other spool 107. In other embodiments there can be a single spool on one side of the shaft 104. In still further embodiments the spool is centrally located and the motor unit 110 winds the spool from the center of the overhead door 100. In some embodiments the motor unit 110 is directly coupled to the shaft 2104 to rotate the shaft 104 to operate the overhead door 100. In other embodiments the motor unit 110 is coupled to a belt drive or other mechanical system used to raise and lower the overhead door 100.

According to the present disclosure a multifunction lock unit 120 is positioned near a side of the overhead door to selectively lock the overhead door 100. The overhead door 100 can have a side rail 122 with holes 124 at various positions. The multifunction lock unit 120 can include a deadbolt 126 that extends outward and projects into one or more of the holes 124 to lock the overhead door 100 in place. The multifunction lock unit 120 can be locked manually or remotely by an electrically operated actuator 150 that can extend and retract the deadbolt 126.

Figure 2:
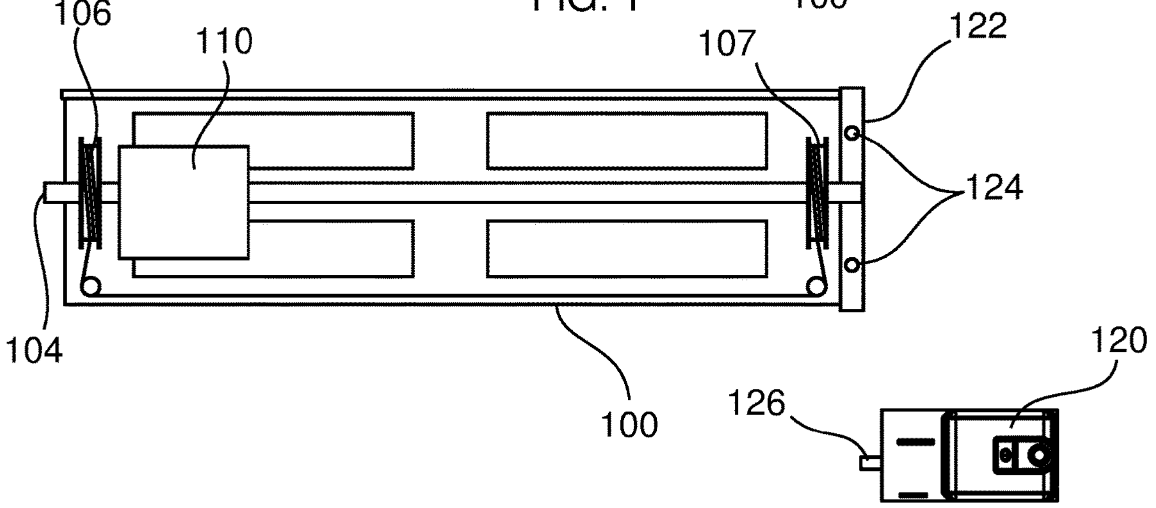
FIG. 2 shows the overhead door in a lifted state according to embodiments of the present disclosure.

FIG. 2 shows the overhead door 100 in a lifted state with the spools 106, 107 wound up and the cables 108, 109 wound up to raise the overhead door 100. The overhead door 100 can be raised and lowered in response to a signal from a remote or a hard-wired control inside the garage or outside the garage. The multifunction lock unit 120 has retracted the deadbolt 126 to allow the overhead door 100 to raise.

Figure 3:
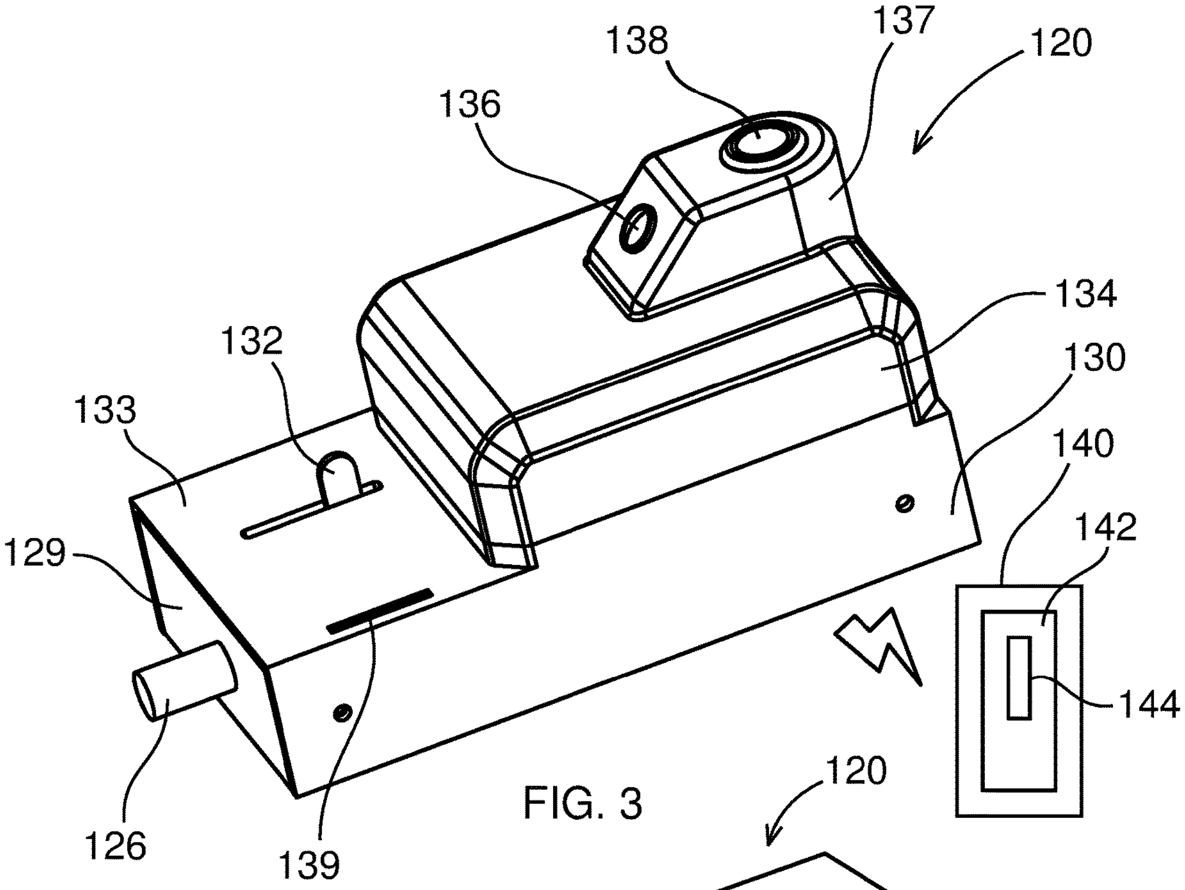
FIG. 3 is an isometric view of the multifunction lock unit according to embodiments of the present disclosure.

FIG. 3 is an isometric view of the multifunction lock unit 120 according to embodiments of the present disclosure. The multifunction lock unit 120 can be secured to a well near an overhead door close enough to lock the overhead door by extending the deadbolt 126 into the overhead door to lock the overhead door. The multifunction lock unit 120 includes a base box 130 that can include a mounting device such as an adhesive, a screw, or another type of fastener. The deadbolt 126 protrudes from a front side 129 of the base box 130 a sufficient distance to lock the overhead door. There is a manual switch 132 on a top side 133 of the base box 130. The manual switch 132 allows the user to manually open and close the deadbolt 126. Inside the base box 130 is an electromechanical actuator (shown to greater advantage in FIG. 6) that can extend and retract the deadbolt 126 in response to a signal from a remote unit such as a garage door opener or a smartphone or a hardwired unit in the garage or outside the garage. In some embodiments the electrically operated actuator 150 does not interfere with the manual switch 132. The electrically operated actuator 150 can be configured to grasp the deadbolt 126 only in response to an instruction to move the deadbolt, after which the electrically operated actuator 150 releases the deadbolt. At other times the electrically operated actuator 150 does not prevent the deadbolt 126 from moving into or out of the multifunction lock unit 120.

The multifunction lock unit 120 can also include an electronics box 134 mounted on the top side 133 of the base box 130. The electronics box 134 can house various electronic components for the multifunction lock unit 120. In some embodiments the electronics box 134 and base box 130 are combined into a single box. In some embodiments there is also an interface component 137 that has a button 138 and a visual indicator 136. The visual indicator 136 can be a light, a text display, a symbol, or any combination thereof. The button 138 can instruct a motor unit to raise, lower, or stop an overhead door. The button 138 can be a multifunction button wherein a single press closes the overhead door and a sustained press or a double press causes the multifunction lock unit 120 to lock the deadbolt 126 after the overhead door is closed. In some embodiments there are two buttons: one for the overhead door and another for the deadbolt 126.

The interface component 137 can be mounted to the electronics box 134. The interface component 137 can also be combined with either of the base box 130 or the electronics box 134. In other embodiments the interface component 137 can be mounted to the base box 130. The multifunction lock unit 120 can communicate with a garage door opener such as the motor unit 110 shown in FIGS. 1 and 2, and pressing the button 138 causes the overhead door to raise or lower depending on the current position of the overhead door and the settings of the motor unit 110. The position of the multifunction lock unit 120 near the overhead door allows the overhead door to be closed by manually pressing the button 138 while standing outside of the garage. The overhead door will then close and there is no need to jump over an optical sensor or to run out of the garage and risk triggering a safety mechanism, or worse, injury.

Once the overhead door is closed, the motor unit can be configured to send a signal to the multifunction lock unit 120 to lock the deadbolt 126. In some embodiments the multifunction lock unit 120 can include a sensor 139 that can determine the state of the overhead door and can lock the overhead door in response to the state of the overhead door. For example, the sensor 139 can observe that the overhead door has been closed and can then extend the deadbolt 126 to lock the overhead door. In other embodiments the sensor 139 can be configured to observe a hole in a side railing (122 in FIGS. 1 and 2) into which the deadbolt 126 is designed to fit, and when the hole is in the appropriate position the deadbolt 126 can be extended to lock the door.

The visual indicator 136 can show different colors for different states of the overhead door and motor unit. In some embodiments, the visual indicator 136 can display a green color when the motor unit 110 and multifunction lock unit 120 are in an operational, standby state where all components are functioning properly and the overhead door is poised to be raised or lowered if such command is given. A different color, such as blue, can be used to mean the deadbolt 126 is locked. A red or yellow color can show there is something wrong with the system, such as lack of power, misalignment, excessive strain or force on one or more components, etc. Barring a power failure, the light is always on.

In some embodiments a man door man door unit 140 can be mounted to a wall near the man door leading into the house and can coordinate with the multifunction lock unit 120 to display the same color light as the visual indicator 136. The man door unit 140 can have a button 142 that may be capable of displaying a light or another visual indicator. In some embodiments the multifunction lock unit 120 can be retrofit to an existing garage door opener and man door unit 140 and can coordinate with the existing visual indicators such as LEDs to change the color and status of the visual indicators. The illumination of the button 142 (if any) can be overridden by the multifunction lock unit 120. In some embodiments where the visual indicators on the existing wall-mounted unit are not able to be changed, a supplemental unit 144 can be attached to the man door unit 140 and can outshine any existing lights on the wall-mounted unit. The supplemental unit 144 may be large enough to physically block a lighted portion of the button 142. The supplemental unit 144 may also include a visual indicator 147.

If there is an existing man door unit 140 with a button 142, the supplemental unit 144 can also have a supplemental button 148 that operates the same as button 138. In some embodiments the supplemental button 148 can be placed over the existing button 142 such that the action required to press button 142 will also cause button 148 to be pressed so the retrofit system will be seamless for the user. The user presses the same button they have been pressing before installing the system. The button 148 and light 147 can operate like the button 138 and light 136. The supplemental unit 144 can communicate with the multifunction lock unit 120 via Bluetooth or Wi-Fi. Alternatively, the multi-function lock unit 120 can communicate electronically with the man door unit 140 via existing hardlines.

Figure 4:
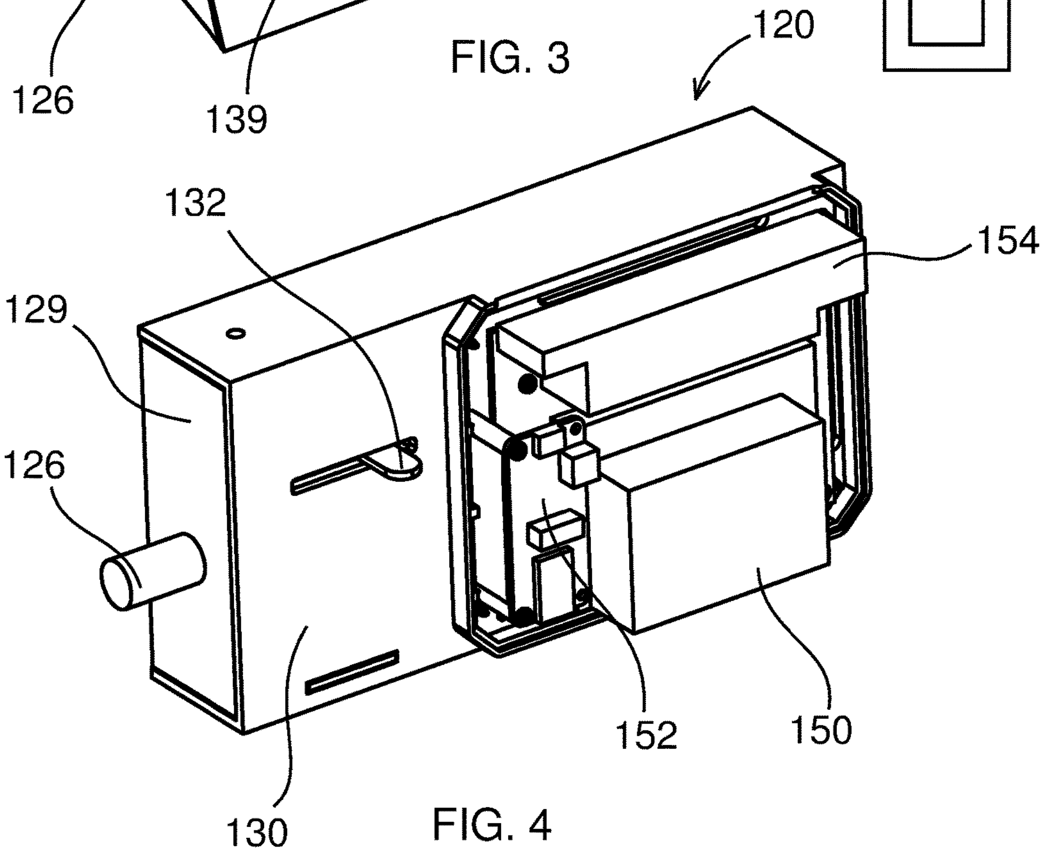
FIG. 4 is an isometric view of the multifunction lock unit with a cover removed according to embodiments of the present disclosure.

FIG. 4 is an isometric view of the multifunction lock unit 120 with a cover removed according to embodiments of the present disclosure. An electromechanical actuator 150 is shown. The electromechanical actuator 150 can be a solenoid or other suitable actuator that can move the deadbolt 126 into and out of a locked position. The electromechanical actuator 150 can also allow manual operation via the manual switch 132. The electromechanical actuator 150 can urge the deadbolt 126 when commanded to do so, and at other times the deadbolt 126 is allowed to move freely back and forth. In other embodiments the manual switch 132 includes a release mechanism whereby grasping the manual switch 132 causes the electromechanical actuator 150 to release the deadbolt 126. The manual switch 132 may have a touch-sensitive surface, whereby touching the manual switch 132 releases the electromechanical actuator.

The multifunction lock unit 120 also includes a printed circuit board (PCB) 152 for the onboard electronics that execute commands and store data etc. There is also a communication module 154 for Bluetooth or Wi-Fi or other wireless communication protocols. The communication module 154 may also be connected to existing hardwires that are common in older garage door opener systems.

The invention has been described with reference to various specific and preferred embodiments and techniques. Nevertheless, it is understood that many variations and modifications may be made while remaining within the spirit and scope of the invention.

What is claimed is:

1. A multifunction lock unit, comprising:
- a base box mountable to a wall near an overhead door, the overhead door being raised and lowered by a motor unit;
- a deadbolt in the base box configured to be extended into and retracted out of a hole in the overhead door to lock the overhead door;
- a manual switch coupled to the deadbolt, wherein the deadbolt can be manually extended and retracted by the manual switch;
- an electrically operated actuator in the base box coupled to the deadbolt, wherein the deadbolt can be extended and retracted by the actuator;
- a wireless communication module configured to:
  - receive a signal from a remote control unit to extend or retract the deadbolt by the actuator; and
  - send a signal to the motor unit to raise or lower the overhead door;
- a button, wherein pressing the button causes the wireless communication module to send a signal to the motor unit to raise or lower the overhead door; and
- a visual indicator configured to display
  - a ready status wherein the wireless communication module is in communication with the motor unit and the motor unit reports no problems, and
  - a problem status, indicating a problem with at least one of the multifunction lock unit or the motor unit.

2. The multifunction lock unit of claim 1, further comprising a man-door unit wirelessly connected to the wireless module, the man-door unit comprising a switch configured to issue a command to the motor unit to raise or lower the overhead door and a second visual indicator coupled to the visual indicator and configured to turn on when the visual indicator turns on, and turn off when the visual indicator turns off.

3. The multifunction lock unit of claim 1 wherein the electrically operated actuator does not interfere with the manual switch.

4. The multifunction lock unit of claim 3 wherein the electrically operated actuator grasps the deadbolt to extend or retract the deadbolt and at other times the actuator does not grasp the deadbolt.

5. The multifunction lock unit of claim 1 wherein the wireless communication module comprises at least one of a Bluetooth module or a Wi-Fi module.

6. The multifunction lock unit of claim 1, further comprising an electronics box physically coupled to the base box, the electronics box containing the wireless communication module.

7. The multifunction lock unit of claim 1, further comprising a second visual indicator to display a status of the deadbolt as either locked or unlocked.

8. The multifunction lock unit of claim 1, further comprising a man door unit comprising:

a first switch configured to instruct the motor unit to raise, lower, or stop the overhead door;

a second wireless communication module configured to wirelessly communicate with the wireless communication module of the multifunction lock unit;

a second switch configured to instruct the multifunction lock unit to extend or retract the deadbolt.

9. The multifunction lock unit of claim 8, the man door unit further comprising a second visual indicator synchronized with the visual indicator on the multifunction lock unit.

10. The multifunction lock unit of claim 1, further comprising a siderail mounted to the overhead door, the siderail comprising one or more holes configured to receive the deadbolt.

11. A locking opener for an overhead door, comprising:

an overhead door having a siderail at a side of the overhead door, the siderail having a recess;

a multifunction lock unit mounted to a wall near the overhead door, the multifunction lock unit comprising:

a deadbolt configured to move between an extended position at least partway into the recess and a retracted position out of the recess;

a manual switch coupled to the deadbolt;

an electrically powered actuator coupled to the deadbolt and configured to move the deadbolt between the extended position and the retracted position;

a first button on the multifunction lock unit configured to instruct the electrically powered actuator to move the deadbolt between the extended position and the retracted position;

a second button on the multifunction lock unit configured to instruct a motor unit to raise, lower, or stop the overhead door; and a power supply for the powered actuator.

12. The locking opener of claim 11, further comprising a communication module in communication with a remote switch and the motor unit, the remote switch being configured to move the deadbolt between the extended and retracted positions and instruct the motor unit to raise, lower, or stop the overhead door.

13. The locking opener of claim 11 wherein the communication module comprises a wireless Bluetooth connection.

14. The locking opener of claim 12 wherein the remote switch is a man door unit having a first switch for moving the deadbolt between the extended and retracted position and a second switch for instructing the motor unit to raise, lower, or stop the overhead door.

15. The locking opener of claim 11, further comprising a visual indicator configured to display a ready indication if the actuator is in a working operational standby mode and a problem indication if the actuator is not in the working operational standby mode.

16. The locking opener of claim 11, further comprising a sensor configured to monitor a position of the recess relative to the deadbolt, wherein the actuator is configured to extend the deadbolt only if the recess is aligned with the deadbolt.

17. The locking opener of claim 16 wherein the sensor comprises a position sensor coupled to the motor unit.

18. A method of locking an overhead door, the method comprising:

in a multifunction lock unit, receiving an instruction to extend a deadbolt from the multifunction lock unit into a recess in the overhead door;

determining whether or not the recess is aligned with the deadbolt;

if the recess is aligned with the deadbolt, and in response to the instruction, extending the deadbolt into the recess; and visually displaying that the deadbolt is in a locked position in the recess.

19. The method of claim 18, further comprising:

in the multifunction lock unit, receiving an instruction to retract the deadbolt from the recess; and once the deadbolt is retracted out of the recess, displaying a light associated with an open position of the deadbolt relative to the recess.

20. The method of claim 18 wherein receiving the instruction to extend the deadbolt comprises receiving a wireless signal from at least one of a wall-mounted unit or a remote control.

* * * * *